(12) United States Patent
Nakano et al.

(10) Patent No.: US 7,968,017 B2
(45) Date of Patent: Jun. 28, 2011

(54) STAMPER FOR OPTICAL DISC, METHOD FOR MANUFACTURING OPTICAL DISC, AND OPTICAL DISC

(75) Inventors: Jun Nakano, Tokyo (JP); Yuji Akiyama, Tokyo (JP); Shin Masuhara, Tokyo (JP)

(73) Assignee: Sony Corporation, Tokyo (JP)

( * ) Notice: Subject to any disclaimer, the term of this patent is extended or adjusted under 35 U.S.C. 154(b) by 1240 days.

(21) Appl. No.: 11/080,607

(22) Filed: Mar. 15, 2005

(65) Prior Publication Data

US 2005/0156339 A1    Jul. 21, 2005

Related U.S. Application Data

(62) Division of application No. 10/297,552, filed as application No. PCT/JP02/03093 on Mar. 28, 2002, now Pat. No. 7,154,843.

(30) Foreign Application Priority Data

Apr. 6, 2001 (JP) .............................. P2001-109162

(51) Int. Cl.
*B29D 17/00* (2006.01)
*B29D 11/00* (2006.01)

(52) U.S. Cl. ........... 264/1.33; 369/272.1; 216/2; 216/24

(58) Field of Classification Search .................. 430/320, 430/322; 264/1.6, 2.5, 1.7; 216/2, 24–26
See application file for complete search history.

(56) References Cited

U.S. PATENT DOCUMENTS

| | | | | |
|---|---|---|---|---|
| 5,516,469 A * | 5/1996 | Santoh et al. | ................. | 264/1.33 |
| 5,676,854 A * | 10/1997 | Inui et al. | ......................... | 216/24 |
| 5,838,653 A * | 11/1998 | Fan et al. | .................... | 369/275.1 |
| 6,207,247 B1 | 3/2001 | Morita | | |
| 6,214,528 B1 * | 4/2001 | Takeda et al. | ................. | 430/320 |
| 6,288,998 B1 * | 9/2001 | Taira | ........................ | 369/275.4 |
| 6,340,558 B1 * | 1/2002 | Kubota et al. | ................. | 430/320 |

(Continued)

FOREIGN PATENT DOCUMENTS

JP   02-44545   2/1990

(Continued)

OTHER PUBLICATIONS

Tajima, English Machine Translation of JP2000-306272, provided at http://www19.ipdl.inpit.go.jp/PA1/result/detail/main/wAAANIaa.4DA412306272P1.html on Sep. 23, 2009.*

(Continued)

*Primary Examiner* — Matthew J Daniels
*Assistant Examiner* — Jodi Cohen
(74) *Attorney, Agent, or Firm* — SNR Denton US LLP

(57) ABSTRACT

This invention relates to a stamper for optical disc and a method for manufacturing an optical disc by using this stamper. A photoresist is applied to a substrate (2) and this photoresist is exposed, developed and then transferred to form a disc master which has a recess/protrusion pattern formed on its one side. The one side of the disc master (20) is etched to narrow the width of a protruding part constituting the recess/protrusion pattern, and the recess/protrusion pattern of the disc master (20) with the reduced width of the protruding part is transferred to form a stamper (30). The recess/protrusion pattern provided on the stamper (30) is transferred to form a predetermined pattern on a substrate of an optical disc.

3 Claims, 3 Drawing Sheets

U.S. PATENT DOCUMENTS

| | | | |
|---|---|---|---|
| 6,570,826 B2 * | 5/2003 | Hosokawa | 369/13.55 |
| 6,697,323 B1 * | 2/2004 | Miki | 369/275.1 |
| 6,711,118 B1 * | 3/2004 | Tajima et al. | 369/275.4 |
| 6,874,262 B2 * | 4/2005 | Nishiyama et al. | 40/321 |
| 7,051,347 B2 * | 5/2006 | Tomiyama et al. | 720/718 |
| 2001/0000746 A1 * | 5/2001 | Edwards | 430/321 |
| 2002/0136984 A1 * | 9/2002 | Blankenbeckler et al. | 430/270.13 |
| 2003/0053407 A1 * | 3/2003 | Hirokane et al. | 369/275.4 |
| 2003/0224084 A1 * | 12/2003 | Nishiyama et al. | 425/403 |
| 2004/0240326 A1 * | 12/2004 | Aoyama et al. | 369/13.24 |

FOREIGN PATENT DOCUMENTS

| | | |
|---|---|---|
| JP | 04-351731 | 5/1991 |
| JP | 10-261242 | 5/1991 |
| JP | 05-25-742 | 9/1993 |
| JP | 05-250742 * | 9/1993 |
| JP | 07-161080 | 6/1995 |
| JP | 09-161336 | 6/1997 |
| JP | 10-106048 | 4/1998 |
| JP | 10-261242 | 9/1998 |
| JP | 10-334517 | 12/1998 |
| JP | 11-296915 | 10/1999 |
| JP | 11-333856 | 12/1999 |
| JP | 11-333885 | 12/1999 |
| JP | 2000-306272 * | 11/2000 |
| JP | 2000-348395 | 12/2000 |

OTHER PUBLICATIONS

European Search Report dated Oct. 18, 2007.
Japanese Office Action, issued on Jan. 8, 2008 (2 pages).

* cited by examiner

STAMPER FOR OPTICAL DISC, METHOD FOR MANUFACTURING OPTICAL DISC, AND OPTICAL DISC

RELATED APPLICATION DATA

The present application is a divisional patent application of U.S. Ser. No. 10/297,552 filed Dec. 6, 2002 now U.S. Pat. No. 7,154,843 claiming priority to Japanese Application No. P2001-109162 filed Apr. 6, 2001 and is a 371 of PCT/JP02/03093 filed Mar. 28, 2002, all of which are incorporated herein by reference to the extent permitted by law.

TECHNICAL FIELD

This invention relates to a stamper for optical disc which transfers a predetermined pattern to an optical disc substrate, a method for manufacturing an optical disc using this stamper, and an optical disc manufactured by this manufacturing method.

BACKGROUND ART

There is an optical disc which enables recording of information signals at a higher recording density than on such optical discs as CD (compact disc) and DVD (digital versatile disk). An optical disc of this type enables recording of information signals at a higher recording density than on CD or DVD by using a light beam having a wavelength of approximately 400 nm, which is shorter than in the case of CD or DVD, for recording or reproducing information signals, and using a numerical aperture (NA) of an objective lens of approximately 0.85, which is larger than in the case of CD or DVD.

For example, the optical disc which enables recording of information signals at a higher recording density than on CD or DVD has a predetermined pattern consisting of lands and grooves formed on one side of a disc substrate, a reflection layer provided for reflecting a light beam onto the predetermined pattern, a signal recording layer made of a phase change material or the like and provided on the reflection layer, and a light-transmitting layer provided on the signal recording layer, and recording or reproduction of information signals is carried out by casting a light beam from the light-transmitting layer side.

Meanwhile, with respect to optical discs, it has been known that a better recording/reproducing characteristic can be realized when recording information signals to a land, which is a protruding part, than when recording information signals to a groove, which is a recess part. Therefore, on the optical disc with a higher recording density of information signals, information signals are recorded to lands by casting a light beam from the optical transmitting layer side, which is opposite to the substrate.

When manufacturing the optical disc with a higher recording density, first, a photoresist is applied on one side of a glass master board and it is exposed and developed to form a recess/protrusion pattern. Nickel-plating or silver-plating is performed thereon to manufacture a disc master. Then, a mother master is manufactured by transferring the recess/protrusion pattern formed on the disc master. This mother master is used as a stamper for forming a predetermined pattern on a disc substrate. Specifically, when manufacturing CD or DVD, a stamper is formed by further transferring the recess/protrusion pattern of the mother, whereas for this optical disc, the mother master can be used as a stamper and a recess part for recording information signal, that is, a land, can be formed on the light-transmitting layer side. On the substrate on which the recess/protrusion pattern is transferred from the stamper as a mother master and thus a predetermined pattern is formed, a reflection layer, a signal recording layer and a light-transmitting layer are sequentially stacked on the side where the predetermined pattern is formed.

Meanwhile, in the case where the ratio of the width of a protruding part to the width of a recess part is set to 1:1 when forming a recess/protrusion pattern on the disc master in order to form a land and a groove on the disc substrate and thus a disc substrate on which the ratio of the width of the land to the width of the groove is 1:1 is formed, if a reflection layer and a signal recording layer are formed on the disc substrate, the ratio of the width of the land to the width of the groove will not be 1:1 and the land will become wider than the groove.

For example, if a predetermined pattern having a recess part with a depth of 20 nm and a land with a width of 0.16 μm, which is half the track pitch of 0.32 μm, is formed on the disc substrate and a signal recording layer is formed thereon, the width of the land will be larger than the width of the groove by approximately 0.02 μm.

To enable reproduction of an information signal-recordable optical disc in a reproducing device for a reproduction-only optical disc having a pit string formed on a disc substrate, the land must be made narrower than the groove to reduce the quantity of reflection of a light beam. This is because the reproducing device for the reproduction-only disc reads out information signals by detecting the reflectivity of a light beam cast onto the optical disc but cannot detect information signals if the reflectivity is too high.

Therefore, in the information signal-recordable optical disc from which reproduction can be carried out by the reproducing device for the reproduction-only optical disc, the width of the land need be less than 50% of the track pitch when the signal recording layer is formed. To satisfy this condition, the width of the recess part for forming the land of the stamper must be less than at least 50%, preferably less than 45% of the track pitch, in consideration of the thickness of the reflection layer and the signal recording layer. However, a cutting machine for exposing a photoresist applied on a glass master board when forming a disc master which is commercially available at present uses a light beam with a minimum wavelength of 257 nm or 266 nm. Even when the diameter of a beam spot is minimized, it is difficult to reduce the width of the track to less than 45% of the track pitch. For example, when the track pitch is 0.32 μm and the depth of the recess part is 20 nm, the width of the recess part is 45% to 50% of the track pitch at best. Moreover, when the width of the recess part is decreased to approximately 45% to 50% of the track pitch, the surface of the stamper will be rough and causes diffuse reflection when reflecting a light beam. Therefore, a good recording/reproducing characteristic cannot be obtained. To realize a good recording/reproducing characteristic, the width of the recess part must be approximately 45% to 65% of the track pitch.

DISCLOSURE OF THE INVENTION

Thus, it is an object of the present invention to provide a new stamper for optical disc, a method for manufacturing an optical disc, and an optical which enable prevention of diffuse reflection of a light beam on a reflection layer by forming the surface of a substrate without any minute recesses and protrusions and thus enable improvement in recording/reproducing characteristic.

It is another object of the present invention to provide a stamper for optical disc, a method for manufacturing an optical disc, and an optical disc which enable reduction in quantity of reflection of a light beam by making the width of a land narrower than the width of a groove in the state where a signal recording layer is provided, and thus enable reproduction in a reproducing device for a reproduction-only optical disc.

It is a further object of the present invention to provide a stamper for optical disc and a method for manufacturing an optical disc which enable manufacture of an optical disc on which the width of a land is narrower than the width of a groove in the state where a signal recording layer is provided, by using an existing cutting machine.

In order to achieve the foregoing objects, a stamper for optical disc according to the present invention has a recess/protrusion pattern formed on one side thereof, the recess/protrusion pattern being for transferring a predetermined pattern to a substrate of an optical disc. The one side has surface roughness (Ra) of 0.4 nm or less for forming a flat surface of the substrate without any recesses and protrusions. In this stamper, at least the width of a recess part for forming a land may be less than 50% of a track pitch so that the width of the land is narrower than the width of a groove in the state where a reflection layer and a signal recording layer are formed on the substrate. In this case, for example, the track pitch is 0.35 μm or less. Since the stamper is flatly formed with surface roughness (Ra) of 0.4 nm or less, there is a risk of sticking to the substrate when releasing. Thus, in the stamper, the recess/protrusion pattern may be provided at least in one of non-signal recording areas on an inner circumferential side and an outer circumferential side in addition to a signal recording area, thus improving its mold release characteristic.

A method for manufacturing an optical disc according to the present invention comprises the steps of: applying a photoresist to a substrate, exposing and developing the photoresist to form a recess/protrusion pattern on one side, and forming a disc master on which a transfer pattern is formed on the basis of the substrate; etching one side of the disc master and thus reducing the width of a protruding part constituting the transfer pattern; further transferring the transfer pattern of the disc master with the reduced width of the protruding part and thus forming a stamper; and transferring the recess/protrusion pattern provided on the stamper and thus forming a predetermined pattern on a substrate of an optical disc. That is, in this manufacturing method, since the roughness on the surface is eliminated by etching the surface of the disc master, exposure can be carried out by using, for example, an existing cutting machine, irrespective of the wavelength of a light beam for exposure.

Moreover, in order to achieve the foregoing objects, an optical disc according to the present invention has a reflection layer and a protection layer stacked on a substrate which has a predetermined recess/protrusion pattern provided on its one side, and the substrate has the predetermined pattern formed thereon as a recess/protrusion pattern is transferred thereto by a stamper having surface roughness (Ra) of 0.4 nm or less. Therefore, the surface of the substrate is flat and also the reflection layer provided thereon is flatly formed. This prevents diffuse reflection of a light beam incident from a light-transmitting layer.

The other objects of the present invention and specific advantages provided by the present invention will be clarified further from the following description of an embodiment with reference to the drawings.

BEST MODE FOR CARRYING OUT THE INVENTION

A stamper, a method for manufacturing an optical disc and an optical to which the present invention is applied will now be described with reference to the drawings.

Figure 1:
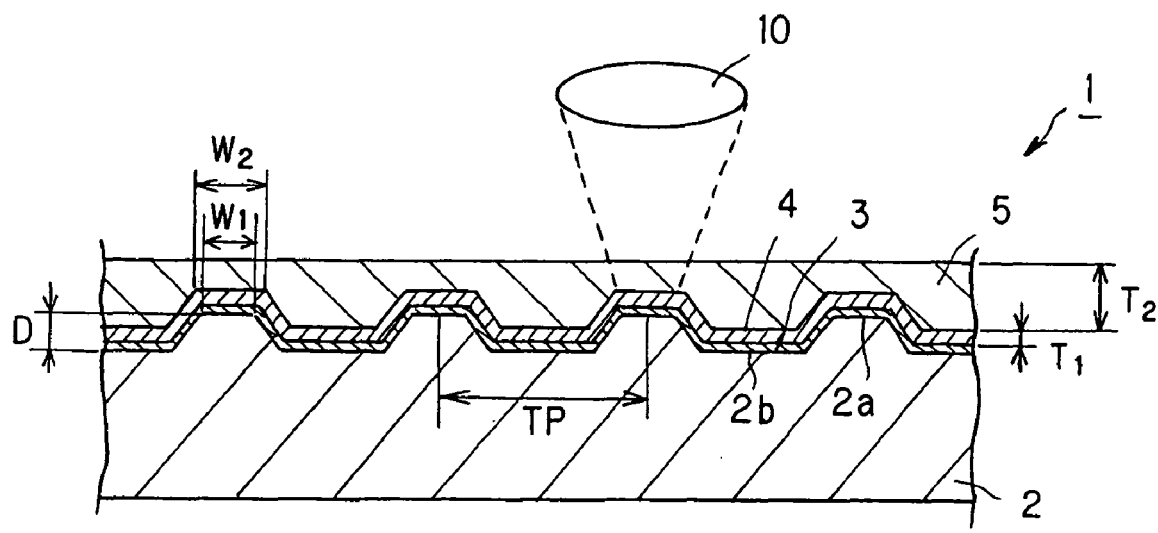
FIG. 1 is a cross-sectional view showing essential parts of an optical disc to which the present invention is applied.
Figure 2:
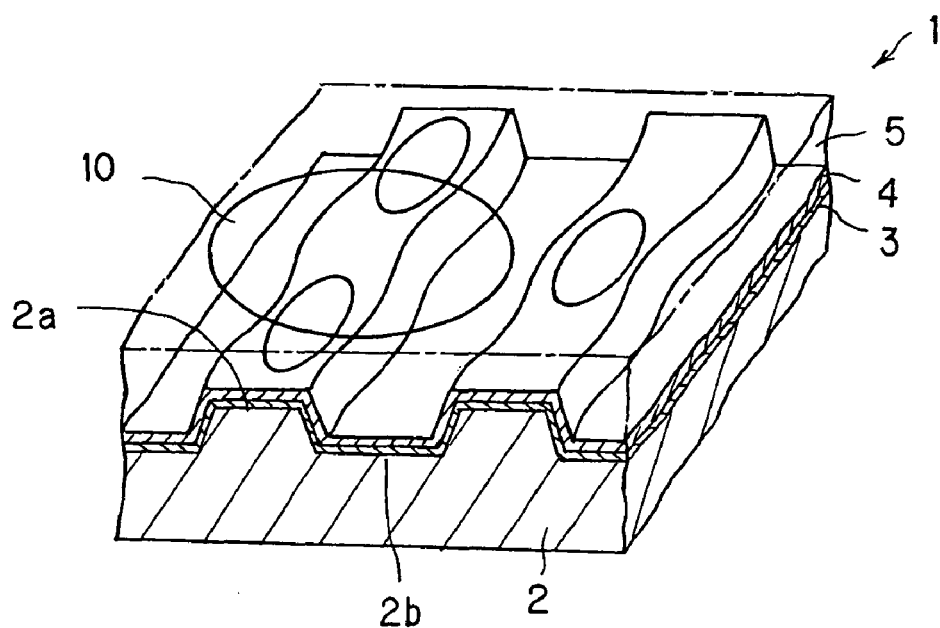
FIG. 2 is a perspective view showing essential parts of the optical disc shown in FIG. 1.

First, an optical disc 1 to which the present invention is applied will be described with reference to the drawings. As shown in FIGS. 1 and 2, this optical disc 1 has a substrate 2 having a land 2a and a groove 2b formed on its one side, a reflection layer 3 provided on the side of the substrate 2 where the land 2a and the groove 2b are formed, a signal recording layer 4 provided on the reflection layer 3, and a light-transmitting layer 5 provided on the signal recording layer 4. This optical disc 1 is adapted for recording information signals to the signal recording layer 4 by casing a light beam thereto from the side of the light-transmitting layer 5. The optical disc 1 has a diameter of 12 cm and a recording capacity of approximately 25 gigabytes.

The substrate 2 is a synthetic resin substrate molded by an injection-molding machine. It is molded with a thickness which enables secure transfer of a recess/protrusion pattern of a stamper, for example, 1.1 mm. Since a light beam is cast onto this substrate 2 from the side of the light-transmitting layer 5 unlike the conventional CD and DVD, the light transmittancy of the substrate 2 is not necessarily required.

On one side of the substrate 2, the land 2a as a protruding part and the groove 2b as a recess part are formed in a vortex-like manner. These land 2a and groove 2b are formed as the recess/protrusion pattern provided on the stamper is transferred to the substrate 2 when molding the substrate 2. On the sidewall of the groove 2b, wobble-modulated address information is recorded. The groove 2b is formed with its depth D being $\lambda/10$ to $\lambda/12$ of the wavelength ($\lambda$) of a light beam, specifically, approximately 20 nm. The land 2a and the groove 2b are formed in such a manner that a track pitch TP is approximately 0.32 μm. In order to make the width of the land 2a on the signal recording layer 4 less than 50% of the track pitch TP, the width $W_1$ of the land 2a is caused to be less than 50% of the track pitch TP, preferably less than 45% of the track pitch TP, in consideration of the thickness of the reflection layer 3 and the signal recording layer 4.

The surface of the side of the substrate 2 where the land 2a and the groove 2b are formed is formed by a stamper with surface roughness (Ra) of 0.4 nm or less and therefore is made flatter than in the case of an ordinary substrate. Therefore, in the optical disc 1, the reflection layer 3 applied on the substrate 2 securely reflects a light beam cast thereto without causing diffuse reflection, thus improving the recording/reproducing characteristic.

On one side of such a substrate 2, the land 2a and the groove 2b are formed not only in a signal recording area in which information signals are recorded, but also in at least an inner circumferential non-signal recording area provided on the inner circumferential side of the signal recording area or an outer circumferential non-signal recording area provided on the outer circumferential side of the signal recording area. Since the one side of the substrate 2 is flattened, its mold release characteristic with respect to the stamper is lowered. Thus, the stamper has the recess/protrusion pattern at least in the non-signal recording area on the inner circumferential side or the outer circumferential side as well as the signal recording area, thus improving the mold release characteristic with respect to the substrate 2. The spacing between the land 2 and the groove 2b provided in the non-signal recording area is 0.1 mm or less. This because if the spacing between the land 2a and the groove 2b is larger than 0.1 mm, the synthetic resin for molding the substrate 2 sticks to the stamper side.

On the one side of the substrate 2 where the land 2a and the groove 2b are formed, the reflection layer 3 for reflecting an incident light beam is formed. This reflection layer 3 is formed by evaporating a metal such as aluminum on the one side of the substrate 2.

On the reflection layer 3, the signal recording layer 4 made of a phase change material is formed. This signal recording layer 4 is formed to a thickness $T_1$ of 200 nm. In the state where the signal recording layer 4 is formed, the land 2a has a width $W_2$ which is less than 50% of the track pitch TP. The signal recording layer 4 may also be made of an organic dye material, a dielectric substance or the like, as well as the phase change material.

On the signal recording layer 4, the light-transmitting layer 5 for transmitting a light beam emitted from an optical pickup is formed. For example, this light-transmitting layer 5 is formed by attaching a light-transmitting polymer sheet onto the signal recording layer 4 with a pressure-sensitive adhesive. Such a light-transmitting layer 5 is formed to a thickness $T_2$ of, for example, 0.1 mm.

In the optical disc 1 constituted as described above, as a light beam with a wavelength of approximately 400 nm cast from the side of the light-transmitting layer 5 is condensed by using an objective lens 10 with a numerical aperture (NA) of 0.85, information signals are recorded to the signal recording layer 4 or information signals recorded on the signal recording layer 4 are read out. This optical disc 1 is rotated at a CLV (constant linear velocity) by a disc rotational driving mechanism.

In the optical disc 1 according to the present invention, since the one side of the substrate 2 is flatly formed, also the reflection layer 3 can be flatly formed. As a result, diffuse reflection of a light beam incident from the light-transmitting layer 5 can be prevented and the recording/reproducing characteristic can be improved. Since the width of the land 2a of the optical disc 1 is less than 50% of the track pitch in the state where the signal recording layer 4 is formed and the quantity of reflection of the light beam is restrained, reproduction of this optical disc 1 in a reproducing device for a reproduction-only optical disc on which information signals are recorded in the form of pits is made possible and cross talk noise can be reduced.

A method for manufacturing the optical disc 1 as described above will now be described.

Manufacture of the stamper for forming the predetermined pattern on the substrate 2 will first described. First, a glass master board is prepared. After a side of the glass master board to which a photoresist is to be applied is polished and flattened, the photoresist is applied, for example, to a thickness of approximately 20 nm in accordance with the depth of the groove 2b. Then, the photoresist is dried. Heat treatment is performed on the glass master board to which the photoresist is applied, and the glass master board is stabilized.

Next, the photoresist applied to the glass master board is cut, that is, exposed, to a predetermined pattern by a cutting machine. The cutting machine exposes the photoresist to the predetermined pattern by using a light beam with a wavelength of 266 nm and an energy density of 0.052 mJ/m$^2$. In this case, the cutting machine rotates the glass master board at a CLV and exposes the photoresist on the basis of the wobble-modulated address information. The exposed area is an area to be the land 2 of the substrate 2.

Then, as the photoresist exposed on the basis of the predetermined pattern is developed, the exposed part is removed. Thus, a recess/protrusion pattern is formed on the glass master board. By electroless plating of nickel or the like, a disc master 20 shown in FIG. 3 is formed from the glass master board on which the recess/protrusion pattern is formed.

Figure 3:
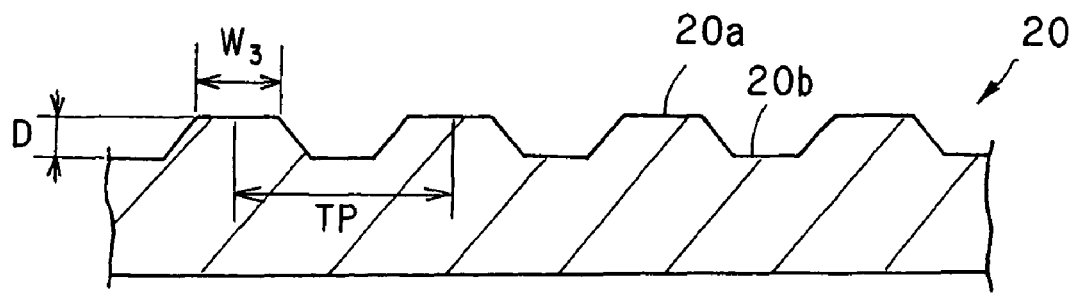
FIG. 3 is a cross-sectional view showing essential parts of a disc master used in the method of the present invention.

As shown in FIG. 3, a protruding part 20a and a recess part 20b are continuously provided on this disc master 20. The recess part 20b is formed to a depth D of, for example, 20 nm. The track pitch TP is 0.32 μm and the protruding part 20a is formed to a width $W_3$ of 0.16 μm, which is half the track pitch TP.

Figure 4:
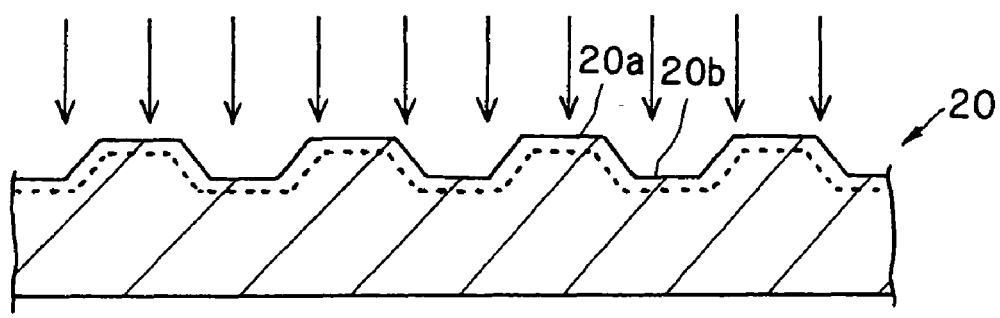
FIG. 4 is a cross-sectional view showing essential parts to explain the state where disc master shown in FIG. 3 is being etched.
Figure 5:
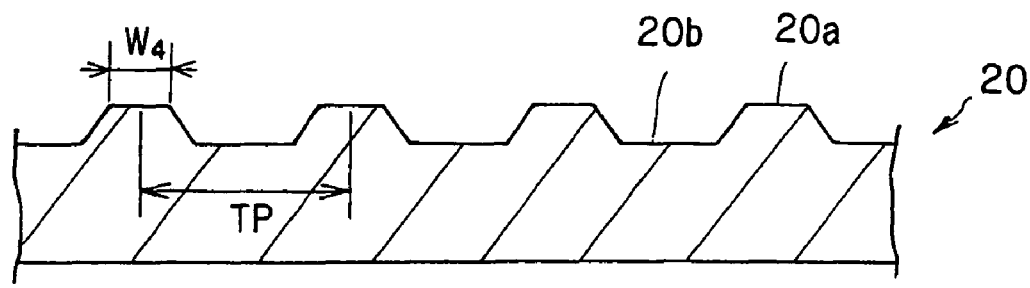
FIG. 5 is a cross-sectional view showing essential parts of the disc master on which etching is performed.

Then, this disc master 20 is etched until the width $W_3$ of the protruding part 20a is reduced to less than 45% of the track pitch TP, as shown in FIG. 4. The etching in this case is dry etching. For example, the disc master 20 is set in a chamber which is made vacuum to $8.0 \times 10^{-3}$ Pa by a rotary pump or a turbo pump, and oxygen or argon is supplied at such a flow rate as to realize $1 \times 10^0$ Pa. Then, etching is carried out for 60 seconds with an RF power of 150 W. As this etching is carried out once, the width $W_4$ of the protruding part 20a is reduced by 0.013 μm, as shown in FIG. 5. By carrying out this etching twice, the width $W_4$ of the protruding part 20a can be reduced to approximately 0.134 μm, with the track pitch TP of 0.32 μm. By this etching, the side where the photoresist is provided is flattened.

Figure 6:
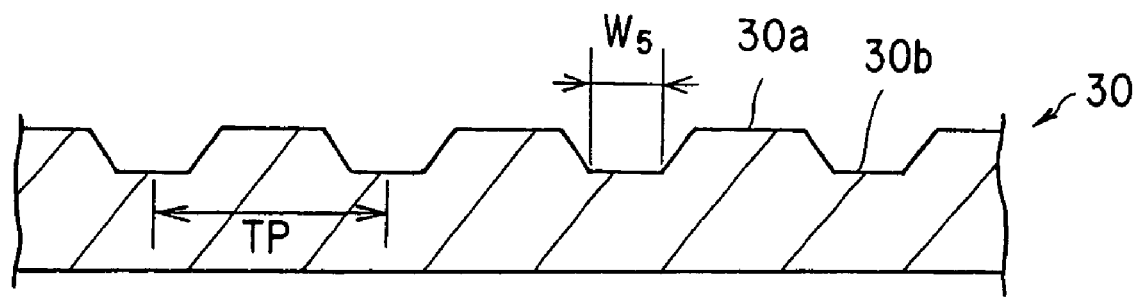
FIG. 6 is a cross-sectional view showing essential parts of a stamper (mother master) manufactured on the basis of the disc master.

A mother master is manufactured on the basis of the disc master 20 on which etching is performed as described above. The mother master becomes a stamper 30 for transferring a predetermined pattern to the substrate 2, as shown in FIG. 6. Since this stamper 30 is manufactured on the basis of the disc master 20 with its surface etched, the stamper 30 has surface roughness (Ra) of 0.4 nm or less. In this stamper 30, the track pitch TP is 0.32 μm and a recess part 30b for forming the land 2a on the substrate 2 has a width $W_5$ of 0.134 μm.

Specifically, in this stamper 30, the width $W_5$ of the recess part 30b is caused to be not less than 30% and less than 50% of the track pitch TP so that the width $W_2$ of the land 2a of the substrate 2 in the case where the signal recording layer 4 is formed is less than 50% of the track pitch TP in order to enable reproduction of the optical disc 1 in a reproducing device for a reproduction-only optical disc. The purpose of causing the width $W_5$ of the recess part 30b to be not less than 30% of the track pitch TP is to secure a necessary quantity of reflection in order to enable reproduction in a reproducing device for a reproduction-only optical disc. The width $W_5$ of the recess part 30b is set within the range of not less than 30% to less than 50% of the track pitch TP in consideration of the thickness of the reflection layer 3 and the signal recording layer 4 formed on the substrate 2.

Figure 7:
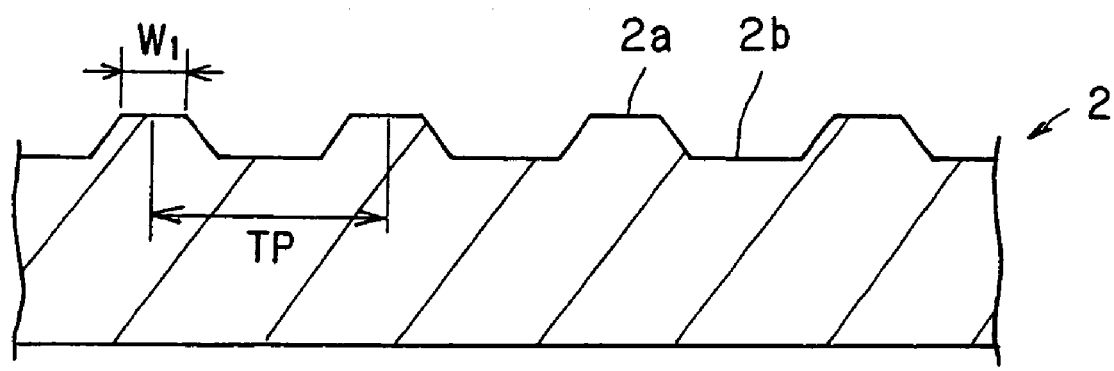
FIG. 7 is a cross-sectional view showing essential parts of a substrate on which a predetermined pattern is transferred by using the stamper.

The stamper 30 is set in a metal mola and the substrate 2 with a thickness of approximately 1.1 mm is formed by injection-molding as shown in FIG. 7. The $W_1$ of the land 2a formed on this substrate 2 is approximately 42% of the track pitch TP. After the reflection layer 3 is formed on one side of the substrate 2, the signal recording layer 4 with a thickness of approximately 200 nm is formed on the reflection layer 3 and the light-transmitting layer 5 with a thickness of approximately 0.1 mm is further formed on the signal recording layer 4.

According to the manufacturing method as described above, a predetermined pattern can be formed on the substrate 2 by using the stamper 30 having surface roughness (Ra) of 0.4 mm or less and the recess part 30b with a width of not less than 30% and less than 50% of the track pitch. In producing this stamper 30, an existing cutting machine can be used as the disc master 20 is etched. The substrate 2 formed by using the stamper 30 has its one side flatly formed and therefore the reflection layer 3 which can securely reflect a light beam incident from the side of the light-transmitting layer 5 can be formed on the one side of the substrate 2. In this manufacturing method, the width of the land 2a on the signal recording layer 4 can be made less than 50% of the track pitch TP and the optical disc 1 which can be reproduced in a reproducing device for a reproduction-only optical disc can be manufactured.

In the method for manufacturing the optical disc 1 according to the present invention, the surface of the substrate 2 can be flattened by etching one side of the disc master 20. The surface of the stamper 30 for forming the land 2a and the groove 2b on the substrate 2 has surface roughness (Ra) of 0.6 to 0.8 nm when the surface of the disc master 20 is not etched. However, the surface roughness of the stamper 30 is reduced to 0.4 nm or less by etching. As a result, in this manufacturing method, the surface of the substrate 2 can be flatly formed and the recording/reproducing characteristic of the optical disc 1 can be improved. For example, in the case of an optical disc manufactured by using a stamper which is manufactured without etching the surface of the disc master 20, C/N of an 8 T signal with a linear density of 0.13 µm/bit is 54 dB, whereas in the case of the optical disc 1 manufactured by using the stamper 30 manufactured on the basis of the disc master 20 which is etched once, this C/N can be improved to 56 dB. Moreover, in the case of the optical disc 1 manufactured on the basis of the disc master 20 which is etched twice, C/N can be improved to 59 dB.

The above-described manufacturing method can also be applied to a method for manufacturing a reproduction-only optical disc, that is, an optical disc such that a pit string corresponding to recording signals is formed on one side of the substrate 2. For example, in the case where a reproduction-only optical disc is manufactured by using a light beam with a wavelength of 266 nm in accordance with the above-described manufacturing method, the jitter is 14% or more when etching of the disc master 20 is not carried out, but the jitter can be improved to 9.6% by etching the disc master 20 only once. This etching reduces the width of the land 2a formed on the substrate 2, and when this etching is carried out on the stamper 30, the thickness of the land 2a which is reduced too much can be restored to a predetermined width, thus reducing defects of the stamper 30. The etching carried out on the stamper 30 can eliminate minute recesses and protrusions generated on the surface when manufacturing the stamper 30 and therefore it can flatten the surface of the substrate 2 to be molded.

As described above, in the present invention, the number of times of etching carried out on the disc master 20 is not limited to the above-described examples and can be changed in accordance with the performance of the etching device, the surface roughness (Ra) of the stamper 30 and the width of the recess part 30b of the stamper 30. As described above, the present invention can be applied not only to the recordable optical disc 1 but also to a reproduction-only optical disc.

INDUSTRIAL APPLICABILITY

Since the stamper for optical disc according to the present invention has surface roughness (Ra) of 0.4 nm or less, the surface of the substrate to which a recess/protrusion pattern is transferred can be made flatter than in the conventional technique. Moreover, the reflection layer provided on the substrate can be flatly provided. Thus, as a light beam is reflected by the reflection layer without causing diffuse reflection, the optical disc having an excellent recording/reproducing characteristic can be manufactured.

In the method for manufacturing an optical disc according to the present invention, since the surface is flattened by etching the disc master, the stamper having the above-described surface roughness (Ra) of 0.4 nm or less can be manufactured irrespective of the wavelength of a light beam of a cutting machine.

Moreover, since the substrate of the optical disc according to the present invention is formed by the stamper having surface roughness (Ra) of 0.4 nm or less, the reflection layer is flatly provided and therefore can securely reflect a light beam, thus improving the recording/reproducing characteristic.

The invention claimed is:

1. A method for manufacturing an optical disc comprising the steps of:
    applying a photoresist to a substrate, exposing and developing the photoresist to form a recess/protrusion pattern on one side, and forming a disc master on which a transfer pattern is formed on the basis of the substrate;
    etching one side of said disc master to reduce the width of a protruding part constituting said transfer pattern such that the surface roughness of the side of the disc master is 0.4 nm or less;
    transferring the transfer pattern of the disc master with the reduced width of said protruding part onto a first substrate to form a stamper; and
    transferring the recess/protrusion pattern provided on said stamper to reduce a predetermined pattern onto a second substrate of an optical disc,
    wherein,
    the photoresist is applied to a thickness of approximately 20 nm on said substrate, and the exposure is carried out using a laser beam with a wavelength of 266 nm.

2. The method for manufacturing an optical disc as claimed in claim 1, wherein a recess part constituting the recess/protrusion pattern of said stamper has a width of not less than 30% and less than 50% of the track pitch.

3. The method for manufacturing an optical disc as claimed in claim 1, wherein the track pitch of said stamper 0.35 µm or less.

* * * * *